United States Patent [19]

Chatterjee et al.

[11] Patent Number: 5,677,072
[45] Date of Patent: Oct. 14, 1997

[54] ZIRCONIA ARTICLES HAVING TETRAGONAL CORES AND MONOCLINIC CASES AND PREPARATION AND SINTERING METHODS

[75] Inventors: Dilip Kumar Chatterjee; Syamal K. Ghosh; Debasis Majumdar, all of Rochester, N.Y.

[73] Assignee: Eastman Kodak Company, Rochester, N.Y.

[21] Appl. No.: 231,870

[22] Filed: Apr. 25, 1994

Related U.S. Application Data

[63] Continuation-in-part of Ser. No. 994,820, Dec. 22, 1992, abandoned.

[51] Int. Cl.⁶ ............................................. C04B 35/48
[52] U.S. Cl. .................. 428/701; 428/697; 428/699; 428/702; 501/103; 501/104
[58] Field of Search ........................ 428/697, 699, 428/701, 702; 501/103, 104

[56] References Cited

U.S. PATENT DOCUMENTS

| | | | |
|---|---|---|---|
| 3,900,542 | 8/1975 | Palmour, III et al. | 264/66 |
| 4,279,655 | 7/1981 | Garvie et al. | 501/104 |
| 4,334,904 | 6/1982 | Yamada et al. | 264/66 |
| 4,344,904 | 8/1982 | Yamada et al. | 501/104 |
| 4,430,279 | 2/1984 | Hagio et al. | 264/66 |
| 4,491,482 | 1/1985 | Hori | 428/404 |
| 4,525,464 | 6/1985 | Claussen | 501/104 |
| 4,564,556 | 1/1986 | Large | 428/402 |
| 4,587,225 | 5/1986 | Tsukuma et al. | 501/103 |
| 4,610,967 | 9/1986 | Imanishi et al. | 501/103 |
| 4,659,680 | 4/1987 | Guile | 501/103 |
| 4,666,467 | 5/1987 | Matsumoto et al. | 501/104 |
| 4,703,024 | 10/1987 | Aronov | 264/64 |
| 4,820,593 | 4/1989 | Egerton et al. | 428/404 |
| 4,851,293 | 7/1989 | Egerton et al. | 428/403 |
| 4,866,014 | 9/1989 | Cassidy et al. | 501/103 |
| 4,886,768 | 12/1989 | Tien | 501/104 |
| 5,290,332 | 3/1994 | Chatterjee et al. | 501/103 |

FOREIGN PATENT DOCUMENTS

| | | |
|---|---|---|
| 0 129 188 | 12/1984 | European Pat. Off. . |
| 0 287 262 | 10/1988 | European Pat. Off. . |

OTHER PUBLICATIONS

Druschitz, Alan et al; *Journal of Americal Ceramic Society*, vol. 72(9), (1989), pp. 1591–1597.

Birkby et al; *Journal of European Ceramic Society*, vol. 5, (1989), pp. 37–45.

Miyamoto et al; "High Performance Ceramic Films and Coatings", Editor: P. Vincenzini, Elsevier Science Publishers, B.V. (1991).

Fleischer et al; *J. Mater Res.*, vol. 5, No. 2, Feb. 1990, pp. 385–391.

Hioki et al; *Advances in Ceramics*, vol. 24, (1988), pp. 679–690.

Majumdar et al; *Journal of Applied Physics*, vol. 70, No. 2 (Jul. 15, 1991), pp. 988–992.

"YTTRIA Stabilized Zirconia", Product Series Profile, Z-Tech Corporation, Jan. 1990.

*P.M.B. Walker, Chambers Science and Technology Dictionary, 1988, Chambers, Cambridge, pp. 25 and 95.

Druschitz, Alan et al; Journal of American Ceramic Society, vol. 72(9), (1989), pp. 1591–1597 discusses hot isostatic pressing of tetragonal zirconia.

(List continued on next page.)

*Primary Examiner*—Archene Turner
*Attorney, Agent, or Firm*—Robert Luke Walker; Arthur H. Rosenstein

[57] ABSTRACT

A method for preparing a ceramic article comprising compacting a particulate alloy of a primary oxide and a secondary oxide to form a blank, and sintering the blank in contact with substantially pure zirconium oxide. The primary oxide is zirconium oxide and the secondary oxide is selected from the group consisting of MgO, CaO, $Y_2O_3$, $Sc_2O_3$, rare earth oxides and combinations thereof. Ceramic articles produced have tetragonal phase cores and monoclinic cases.

10 Claims, 7 Drawing Sheets

OTHER PUBLICATIONS

Birkby et al; Journal of European Ceramic Society, vol. 5, (1989), pp. 37–45 discloses surface transformation of tetragonal zirconia.

Miyamoto et al; High Performance Ceramic Films and Coatings, Editor P. Vincenzini, Elsevier Science Publishers. B.V. (1991) discloses hot isostatic pressing of tetragonal zirconia.

Fleischer et al; J. Mater Res., vol. 5, No. 2, (Feb. 1990), pp. 385–391 discloses ion implantation of zirconia.

Hioki et al; Advances in Ceramics, vol. 24, (1988), pp. 679–690 discloses ion implantation of zirconia with phase transformation.

Majumdar et al; Journal of Applied Physics, vol. 70, No. 2 (Jul. 15, 1991), pp. 988–992 is of background interest only.

"YTTRIA STABILIZED ZIRCONIA", Product Series Profile, Z–TECH Corporation, Jan. 1990 is of background interest only.

ZIRCONIA ARTICLES HAVING TETRAGONAL CORES AND MONOCLINIC CASES AND PREPARATION AND SINTERING METHODS

This is a Continuation-In-Part of application Ser. No. 07/994,820, filed 22 Dec. 1992 now abandoned.

FIELD OF THE INVENTION

The present invention pertains to ceramic items and methods for preparing ceramic items and more particularly pertains to zirconia articles having monoclinic surfaces, and methods for preparing such articles and for sintering.

BACKGROUND OF THE INVENTION

In many uses, such as the production of photographic film and paper, cutting tools, such as perforators and slitter knives, require impact resistance to eliminate catastrophic failures and corrosion, and wear and abrasion resistance to improve service life and productivity. Conventional cutting tool materials, such as high speed steels, hardenable stainless steels, and cemented tungsten carbides, meet some of these requirements but have the limitation of requiring frequent maintenance due to wear. Yttria-doped tetragonal zirconia polycrystal (Y-TZP) ceramic materials offer many advantages over conventional materials and are therefore used in cutting, perforating, slitting and chopping of photographic film and paper webs. Y-TZP is one of the toughest ceramics. The toughness is achieved at the expense of hardness and strength.

It is known that impact bearing tools or parts have a longer service life and better performance if made with a core of a tough material and a surface or case of a hard material that is created from a block that has a core encased by a surface material. Common examples nitrided or case carburized metal tool parts, camshafts and the like. A surface treatment such as carburizing or nitriding is used to form a stable hard phase over a tougher core. The phase changes are dependent upon the reactivity of the parent metallic material with a reacting material, for example, a carbon or nitrogen species. In ceramics, inherent chemical inertness has impeded the preparation of comparable composite structures. Ceramic articles having surface areas with stress induced phase changes are very easy to achieve, since such phase changes occur as a result of abrasion on working surfaces during use. With Y-TZP, stress induces transformation from a tough, but not very hard tetragonal phase to a harder monoclinic phase. This phase change can be utilized in different ways. Net shape tetragonal zirconia alloy articles can be produced as disclosed in U.S. patent application Ser. No. 07/816,646, by Syamal K. Ghosh, Dilip K. Chatterjee, and Dennis R. Koziol, filed Dec. 31, 1991. The term "net shape" is defined as a ceramic article that is dimensionally true after sintering and therefore does not necessitate further machining prior to use in its intended working environment. During use, working surfaces of a net shape article will be subject to phase transformation. Suitable tolerances will permit abrasion losses at working surfaces, prior to phase transformation, to be ignored. Alternatively, phase transformation to monoclinic can be induced by an abrading process, such as grinding or lapping, during fabrication of the tool. Neither approach is straight-forward in that two variables, the dimensions of the article and its phase characteristics are changing simultaneously. Both approaches are extremely problematic when attempted with an article having a complex geometry.

An alternative approach is taught by U.S. patent application Ser. No. 07/816,646, entitled CERAMIC ARTICLES AND METHODS FOR PREPARING CERAMIC ARTICLES AND FOR SINTERING, filed Mar. 5, 1992, by Dilip K. Chatterjee, Debasis Majumdar, Syamal K. Ghosh, and Jose M. Mir; which is hereby incorporated herein by reference. In that approach, a tetragonal zirconia alloy article, which can be near net shape, is compacted and then sintered in the presence of an MgO, CaO, $Y_2O_3$, $Sc_2O_3$, $Ce_2O_3$, or other rare earth oxide dopant to produce an article having a tetragonal core and a cubic phase case. The dopant can be provided in a number of different forms such as a solid plate, a powder, or a layer produced by decomposition of an organo-metallic precursor film. In a United States patent application entitled, CERAMIC ARTICLES HAVING CUBIC SPINEL ON SURFACES AND METHODS FOR PREPARING CERAMIC ARTICLES AND FOR SINTERING, filed by Syamal K. Ghosh, Dilip K. Chatterjee, Debasis Majumdar, and Dennis R. Koziol concurrently with this application; a method is described for producing articles having a core which is a sintered particular mixture of zirconia alloy and alumina and a case which has a cubic spinel structure.

It would be desirable to provide a method for producing zirconia alloy articles having a tetragonal phase core and a monoclinic case, which does not require stress induced phase transformations.

SUMMARY OF THE INVENTION AND ITS ADVANTAGES

What the art has failed to accomplish is the preparation, by any method other than stress induced transformation, of a sintered zirconia ceramic article having:

- a tough core consisting essentially of a first mass of sintered particles having a substantially tetragonal crystal structure, and
- a hard casing consisting essentially of a second mass of sintered particles having a substantially monoclinic crystal structure.

The claimed zirconia ceramic article of the invention is prepared by a method in which:

(1) a blank is formed by compacting particulate alloy, and then (2) the blank is sintered in contact with a secondary oxide.

The cited art teaches unsintered microspheres formed by gelation or ceramic bodies having a single mass of uniform, multilayered sintered particles.

In the broader aspects of the method for preparing ceramic articles of the invention, there is provided a method for preparing a ceramic article comprising compacting a particulate alloy of a primary oxide and a secondary oxide to form a blank, and sintering the blank in contact with substantially pure zirconium oxide that creates a block that has the core encased by a monoclinic material. The primary oxide is zirconium oxide and the secondary oxide is selected from the group consisting of MgO, CaO, $Y_2O_3$, $Sc_2O_3$, rare earth oxides and combinations thereof. Ceramic articles produced have tetragonal phase cores and monoclinic cases.

It is an advantageous effect of at least one embodiment of the invention that a ceramic article can be provided which has a substantially monoclinic zirconia alloy case over a substantially tetragonal zirconia core.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying drawing wherein.

DESCRIPTION OF A SPECIFIC EMBODIMENT

In the methods of the invention, particulate zirconia alloy is compacted and sintered. The sintering is performed in the presence of what is referred to herein as an "adjunct", pure or substantially pure zirconia. The resulting ceramic article of the invention has a substantially monoclinic structure case and a substantially tetragonal structure core.

The sintering step utilized in the methods of the invention is unlike previous zirconia alloy sintering procedures. It is ordinary practice in previous tetragonal structure zirconia alloy sintering procedures to place a blank or preform upon a plate of $ZrO_2$ or $Al_2O_3$ during sintering. The ceramic parts produced by those procedures have a tetragonal structure both on the surface and within the part. In the method of U.S. Pat. No. 5,290,332, zirconia alloy ceramic blanks are sintered in the presence of a "dopant" selected from: MgO, CaO, $Y_2O_3$, $Sc_2O_3$ and $Ce_2O_3$ and other rare earth oxides. These materials represent "alloying agents", that is, oxides which can be combined with $ZrO_2$ to provide a zirconia alloy.

It is a novel and surprising feature of the methods of the invention that the sintering of a zirconia alloy blank is carried out in the presence of a pure or substantially pure zirconia adjunct. The term "substantially pure zirconia" is used herein to describe a zirconia alloy which retains the monoclinic structure of pure zirconia at room temperature and pressure, and has less than 1 percent of alloying oxides or contaminants. The term "adjunct" is used herein instead of the term "dopant", because it is believed that the sintering step of the methods of the invention does not cause a "doping" of the zirconia adjunct into a compacted item or "blank". It is instead believed that alloying agent is "doped" out of the blank into the zirconia adjunct. This explanation is believed to be correct, however, the scope of the claimed invention is not limited by this explanation or any other explanation or theory presented herein.

Figure 1:
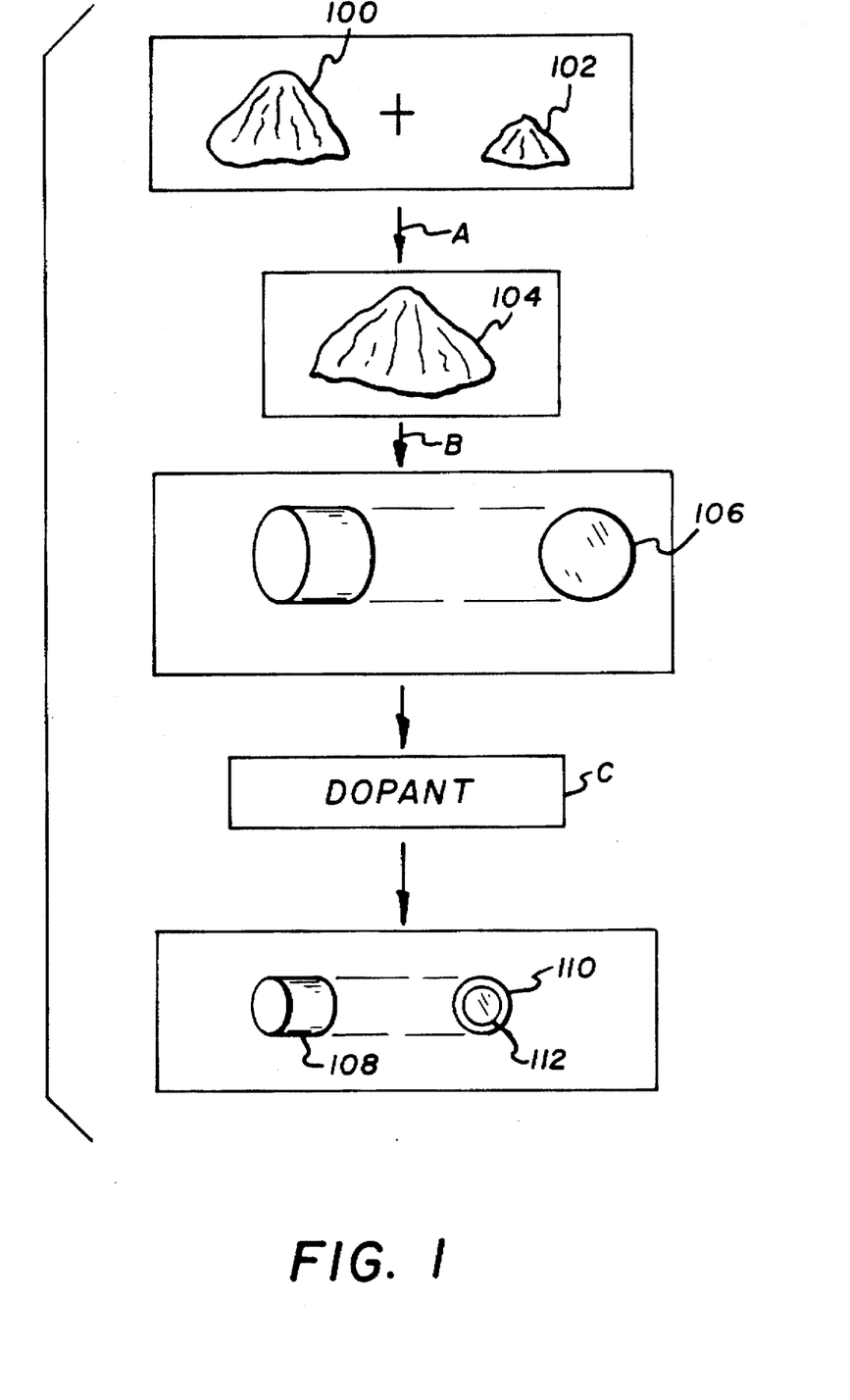
FIG. 1 is a schematic diagram of the method of the invention.

The result of the methods of the invention is an article in which a substantially monoclinic structure zirconia alloy cast overlays a substantially tetragonal structure zirconia alloy core. The methods of the invention utilize blanks composed of particulate alloys of $ZrO_2$ and additional oxide selected from: MgO, CaO, $Y_2O_3$, $Sc_2O_3$ and $Ce_2O_3$ and other rare earth oxides (also referred to herein as "Mg-Ca-Y-Sc-rare earth oxides"). Zirconia alloys useful in the methods of the invention have a meta-stable tetragonal crystal structure in the temperature and pressure ranges at which the ceramic article produced will be used. For example, at temperatures up to about 200° C. and pressures up to about 1000 MPa, zirconia alloys having about 2 to about 20 mole percent Mg-Ca-Y-Sc-rare earth oxide exhibit a tetragonal structure. Preferred oxides for alloying with zirconia are $Y_2O_3$, MgO, CaO, $Ce_2O_3$ and combinations of these oxides. Step "A" in FIG. 1, diagrammatically illustrates the alloying process. Zirconia powder 100 is combined with one or more secondary oxide powders 102 to provide zirconia alloy powder 104. It is preferred that the zirconia powder have a high purity, greater than about 99.9 percent. The preparation of zirconia alloys is well known to those skilled in the art and zirconia alloys are available commercially. For example, particulate zirconia alloy having 3 mole percent $Y_2O_3$ is marketed by Z-TECH Corporation, Bow, N.H., as "SY-ULTRA 5.2 Yttria Stabilized Zirconia".

The grain and agglomeration sizes and distributions, moisture content and use of binder in the zirconia alloy are selected in a manner well known to those skilled in the art. "Grain" is defined as an individual crystal, which may be within a particle, having a spatial orientation that is distinct from that of adjacent grains. "Agglomerate" is defined as an aggregation of individual particles, each of which may comprise multiple grains. An example of useful grain and agglomeration sizes and distributions for a particular embodiment of the invention is the following. The grain size is from about 0.1 micrometers to about 0.6 micrometers. The average grain size is 0.3 micrometers. The distribution of grain size is: 5–15 percent less than 0.1 micrometers, 40–60 percent less than 0.3 micrometers, and 85–95 percent less than 0.6 micrometers. The surface area of each individual grain ranges from about 10 to about 15 $m^2$/gram or is preferably 14 $m^2$/gram. Agglomerate size is from about 30 to about 60 micrometers and average agglomerate size is 40–60 micrometers. Moisture content of the powder is about 0.2 to 1.0 percent by volume of blank and is preferably 0.5 percent. The zirconia alloy powder is compacted in the presence of a binder such as gelatin or polyvinyl ionomer or more preferably polyvinyl alcohol. The binder is added to and mixed with the powder, for example by spraying or ball milling prior to placement of the powder in a compacting device.

Specific examples of alloys useful in the methods of the invention include: tetragonal structure zirconia alloys having from about 2 to about 5 mole percent $Y_2O_3$, or more preferably about 3 mole percent $Y_2O_3$. Examples of tetragonal structure zirconia alloys useful in the methods of the invention are disclosed in U.S. patent application Ser. No. 07/816,646, by Syamal K. Ghosh, Dilip K. Chatterjee, and Dennis R. Koziol, filed Dec. 31, 1991. In U.S. patent application Ser. No. 07/816,646, the alloy is selected so as to provide a "net shape" ceramic article as that term is defined therein: a ceramic article that is dimensionally true after sintering and therefore does not necessitate further machining prior to use in its intended working environment. In other words, the amount of shrinkage during sintering is predictable, producing a ceramic part that conforms to a predetermined shape and dimensions. The particulate zirconia alloy is substantially uniform. Purity of the alloy is well controlled at 99.9 to 99.99 percent, that is, impurities are no more than about 0.1 to 0.01 percent. Grain size is from about 0.1 micrometers to about 0.6 micrometers. Average grain size is 0.3 micrometers. The distribution of grain size is: 10 percent less than 0.1 micrometers, 50 percent less than 0.3 micrometers, and 90 percent less than 0.6 micrometers. Surface area of each individual grain ranges from about 10 to about 15 m²/gram and is preferably 14 m²/gram. Agglomerate size is from about 30 to about 60 micrometers. Average agglomerate size is 50 micrometers. Moisture content of the powder is about 0.2 to 1.0 percent by volume of blank and is preferably 0.5 percent.

In addition to being compacted, the zirconia alloy powder 104 is: heated to a temperature range at which sintering will occur; sintered, that is, maintained at that temperature range for a period of time; and then cooled. During all or part of sintering, the zirconia alloy powder 104 is in contact with adjunct, as discussed below in detail. Compaction and sintering are generally discussed herein as two consecutive operations, as indicated by "B" and "C" in FIG. 1, however, the invention is not limited to a particular sequence of compacting and sintering. For example, compaction and sintering can be simultaneous in a single operation or partial compaction can be followed by sintering and further compaction. The interim product of compacting and sintering operations is referred to herein as a "blank", which is illustrated as element 106 in FIG. 1. Blank 106 is at least partially compacted and is either unsintered or not fully sintered. Completion of compacting and sintering provides the finished ceramic article 108, which has a substantially monoclinic phase case 110 and a substantially tetragonal phase core 112.

The particular method of compacting the zirconia alloy powder is not critical. In a preferred embodiment of the invention, the particulate zirconia alloy is cold compacted to provide an unsintered blank, which is also referred to herein as a "green preform". The terms "cold compaction" and the like refer to compression of the particulate alloy at a temperature below glass transition or decomposition temperature of the binder. The green preform can be produced by such methods as cold uniaxial pressing, cold isostatic pressing, or cold extrusion. The alloy powder is preferably subjected to uniform compacting forces in order to provide a blank 106 which has a uniform density.

Figure 2:
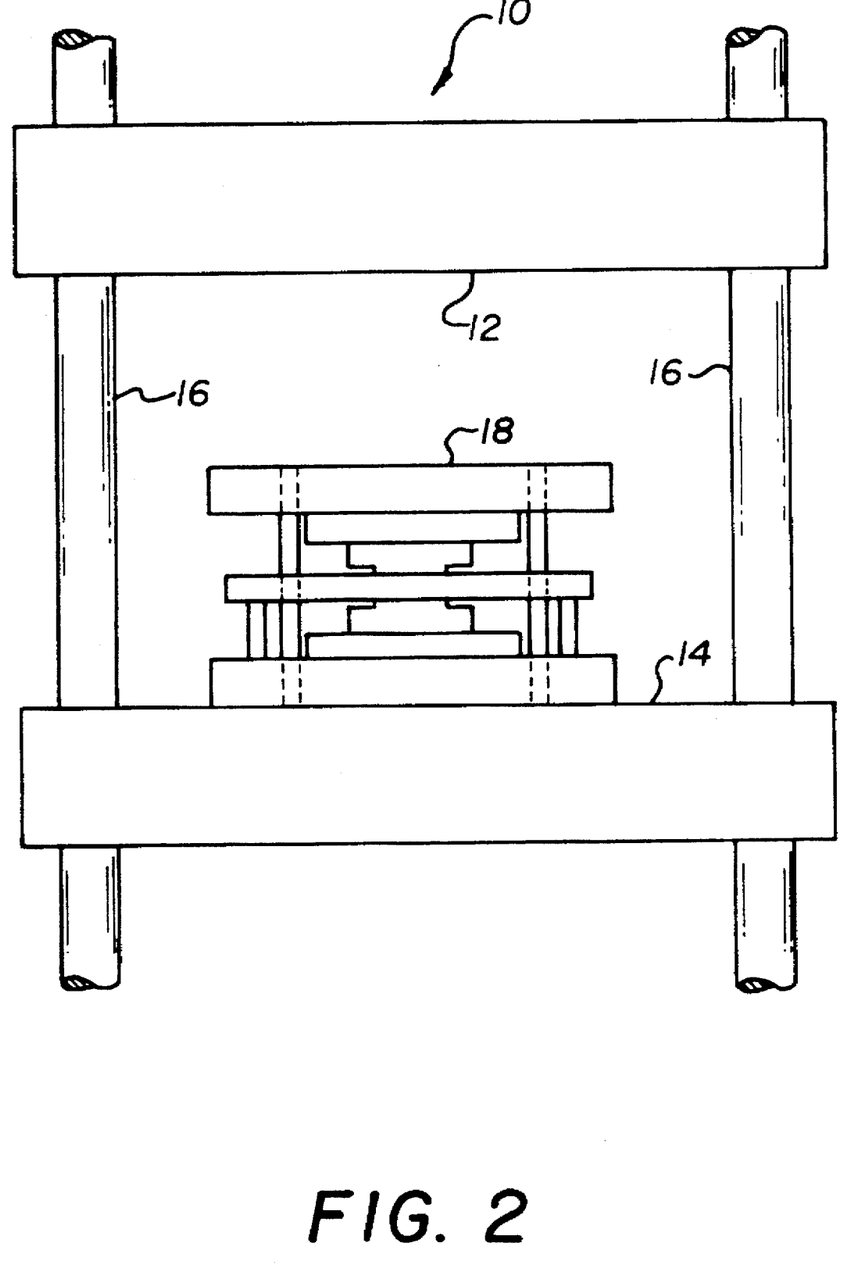
FIG. 2 is a fragmentary, cross-sectional view of a die press useful in the method of the invention.
Figures 3, 4:
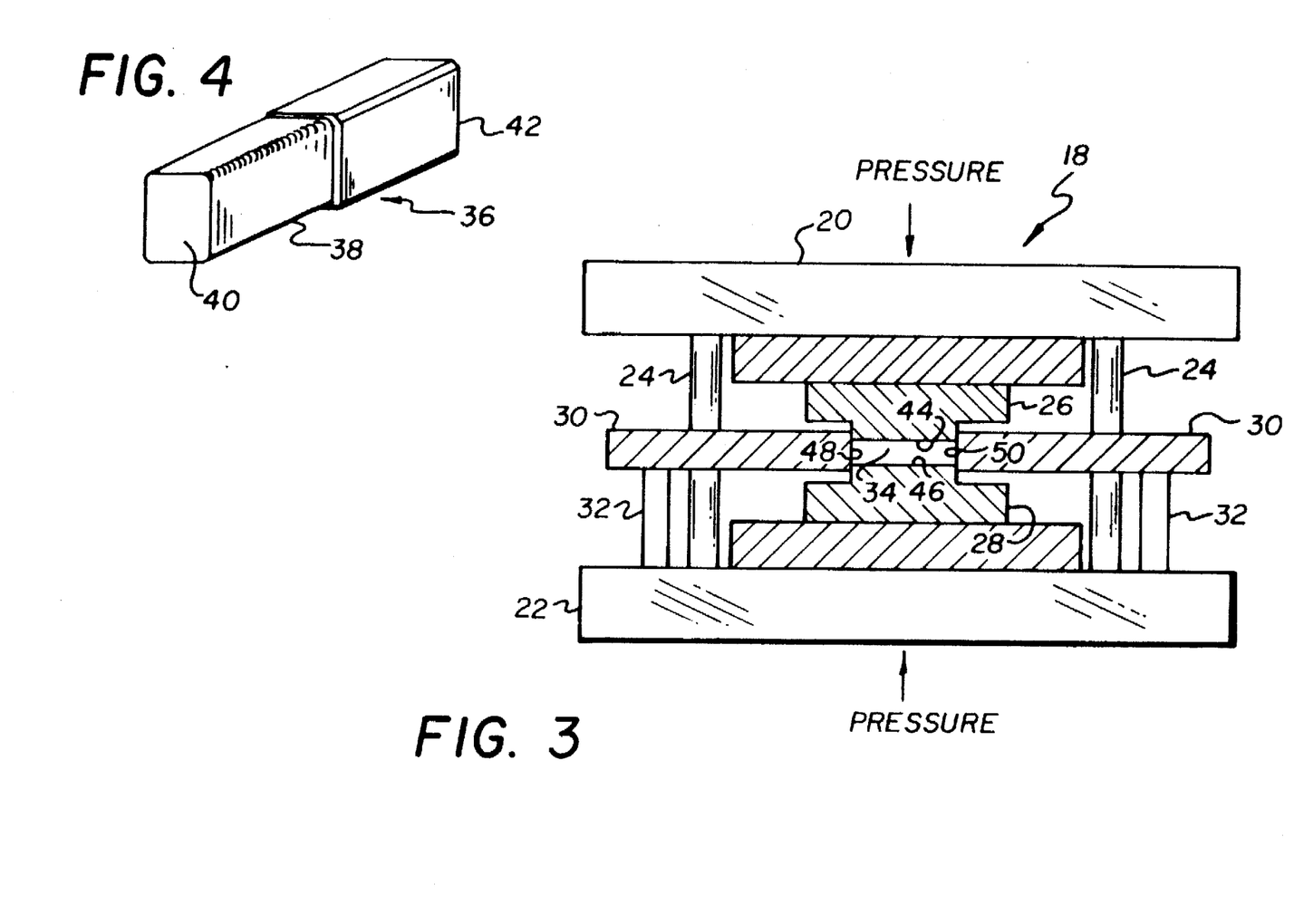
FIG. 3 is an enlarged cross-sectional view of the mold and die assembly of the die press of FIG. 2.
FIG. 4 is an enlarged schematic view of a ceramic perforator punch according to the invention.

A preferred compacting device that achieves uniform compacting forces is a floating mold die press 10, as disclosed in U.S. patent application Ser. No. 07/816,646 and as shown in FIG. 2. Die press comprises fixed platform 12 and movable platform 14 mounted on supports 16. Movable platform 14 is driven by hydraulic means (not illustrated) and supports mold and die assembly 18. FIG. 3 further illustrates assembly 18 as comprising plates 20, 22, which are slideably mounted on rods 24. Die sets 26,28 are mounted respectively on plates 20,22. Center platen 30 is mounted by spacer plates 32 on plate 22, and together with die sets 26,28 defines cavity 34 therebetween. The zirconia alloy is compacted by first placing in cavity 34, a selected amount of zirconia alloy powder mixed with binder. Platform 14 is then moved in the direction illustrated by the direction arrow in FIG. 2 so that plate 20 contacts platform 12 with a hydraulic pressure in the above described range, forcing plate 22 toward plate 20 and thereby compacting the powder to form the blank or green preform. The compaction forces exerted on the powder are substantially uniform because plates 20,22 are each free to move on rods 24, resulting in a blank having a uniform density.

Mold and die assembly 18 should have dimensionally close tolerances in order to minimize or eliminate the need for post-sintering machining of working surfaces of the finished ceramic article. For example, compaction surfaces 44,46 of respective die sets 26,28 can be parallel with a maximum design deviation from parallel of plus or minus 0.00005 inches. Compaction surfaces 48,50 of center platen 30 can be perpendicular to surfaces 44,46 and have a maximum design deviation from perpendicularity of plus or minus 0.00005 inches. The fill ratio should be established to produce a blank of a desired dimension, which after sintering will result in a ceramic of the final desired dimension. "Fill ratio" is the ratio of the height of cavity 34 taken along the axis of movement of platform 14 with platform 14 in its initial, lowermost position, to the height of the green part formed in cavity 34 taken along the axis of compaction of the powder in cavity 34. In other words, such height of the green preform also equals the distance between compaction surfaces 44,46 of mold and die assembly 18 at the final end-of-compacting position.

In a preferred method of the invention, the alloy powder is cold compacted to a "green" density which is substantially less than the tetragonal structure final sintered density, that is, the density of the green preform 106 is substantially less than the density of a tetragonal structure ceramic article 108 produced from that green preform 106 after sintering. The final sintered density of a completely tetragonal structure ceramic article differs slightly from the final sintered density of a ceramic article 108 of the invention in that articles 108 produced by the methods of the invention have a substantially monoclinic structure case 110 and a substantially tetragonal structure core 112. Except for very small articles 108, this difference can be ignored and final sintered density can be considered the density of the article 108 produced by the methods of the invention after sintering. It is preferred that the green density be between about 40 and about 65 percent of the tetragonal structure final sintered density, or more preferably be about 60 percent of the tetragonal structure final sintered density. In a particular embodiment of the invention, an article 108 produced from a zirconia alloy having 3 mole percent $Y_2O_3$ has a final sintered density of about 6 grams/cc, a range of preferred green densities of from about 2.5 to about 4.0 grams/cc, and a more preferred green density of about 3.65 grams/cc.

For a particular powder distribution, the green density is largely dependent upon the compaction pressure and the fill ratio. Preferred compaction pressures in the methods of the invention are about 10,000–30,000 psi (69–207 MPa). A more preferred compaction pressure is about 15,000 psi (about 100 MPa). The fill ratio is maintained at from about 2.5 to 1 to about 3.5 to 1. A preferred fill ratio is about 3.0 to 1. Compaction time can be readily determined by the operator depending upon the compaction pressure selected. Compaction time, for example, can be in the range of from about 60 seconds to about 10 seconds for compaction pressures in the range of about 12,000 psi to about 18,000 psi, respectively. For a compaction pressure of 15,000 psi (100 MPa), the compaction time can be 30 seconds. It is well known that the compaction pressure and time selected by the operator can be dependent upon the size of the finished part 108. Generally, as the part size increases, compaction time is increased.

A theoretical explanation can be provided for the results seen in the methods of the invention, however, the invention is not limited by any particular theory or explanation. It is believed that the method of U.S. patent application Ser. No. 07/816,646 succeeds as the result of diffusion of MgO or other oxide inward from the adjunct during sintering and a resulting change in the composition of the case of the zirconia alloy part. In the method of the invention claimed herein, it is believed that alloying oxide diffuses out of the zirconia alloy article into the zirconia adjunct. The sintering is continued for a sufficient time period for the case of the article being sintered to reach a thermodynamic equilibrium structure. The thermodynamic metastable equilibrium structure for the case of the article, which is in contact with the adjunct, is monoclinic. The core is not in contact with the adjunct and continues to have a tetragonal equilibrium structure. By this explanation, the method of U.S. patent application Ser. No. 07/816,646 represents an alloying oxide enrichment process and the method of the claimed invention represents an alloying oxide depletion process.

It is preferred that the sintering result in a ceramic article 108 having a "full" or nearly theoretical density, and it is more preferred that the density of the ceramic article 108 be from about 99.5 to about 99.9 percent of theoretical density. In a particular embodiment of the invention, an article produced from a zirconia alloy having 3 mole percent $Y_2O_3$ has a final sintered density of about 6 grams/cc with a grain size of less than 1 micrometer and preferably less than 0.5 micrometers.

Sintering is conducted in air or other oxygen containing atmosphere. The zirconia adjunct, is in contact with the blank during sintering. The methods of the invention are not limited to any particular sintering pressure and temperature conditions. Sintering can be performed at atmospheric pressure or alternatively a higher pressure can be used during all or part of the sintering to reduce porosity. An example of a useful range of elevated sintering pressures is from about 69 MPa to about 207 MPa, or more preferably about 100–103 MPa. An example of a useful range of sintering temperatures is from about 1400° to about 1600° C., or more preferably about 1500° C. An example of a useful range of sintering times is from about 1 hour to about 3 hours or more preferably about 2 hours. In a particular embodiment of the methods of the invention, the sintering peak temperature is 1500° C. and that temperature is maintained for about 2 hours.

It is preferred that the sintered blank be slowly heated to sintering temperature and slowly cooled so as to avoid undesirable dimensional changes and crack development. In an embodiment of the invention having a preferred sintering temperature of 1500° C., preferred temperature ramps during heating are: about 0.3° C./minute for room temperature to about 300° C., about 0.1° C./minute for about 300° C. to about 400° C., about 0.4° C./minute for about 400° C. to about 600° C., and about 1.5° C./minute for about 600° C. to about 1500° C. Preferred temperature ramps during cooling are: about 2° C./minute for about 1500° C. to about 800° C. and about 1.6° C./minute for about 800° C. to room temperature.

The exact manner in which the adjunct is in contact with the blank during sintering is not critical, however, the monoclinic structure case is limited to those areas of the blank in contact with the adjunct during sintering. In the Example, a blank resting on zirconia powder during sintering showed a case having monoclinic phase on the surface in contact with the zirconia powder and tetragonal phase on the other surfaces. This contrasts with Comparative Example 1, in which a blank resting on an inert plate retained a completely tetragonal structure. Comparative Examples 2–5 utilize a method disclosed in U.S. patent application Ser. No. 07/816,646, but are illustrative of a transfer of oxide similar to the claimed invention. Comparative Example 4 shows a phase change when a dopant is provided as a powder. This resembles the Example. Comparative Example 2 illustrates that contact must be provided during sintering to final density rather than during a resintering step. In Comparative Examples 3 and 5 other manners of contact are successfully used: powder is replaced by a solid plate in Example 3 and by a metallo-organic decomposition (MOD) product in Example 5. In MOD, a metallo-organic precursor is dissolved in a solvent and layered over a substrate which is then thermally decomposed at a temperature of about 500° to 600° C. to yield metal oxide. Precursor coatings can be applied in MOD by spinning or by other means such as dipping. Other precursors: metallo-organics, organo-metallics and inorganic metal salts, which yield zirconia upon decomposition at a temperature less than the sintering temperature of the zirconia alloy, can be applied in a manner comparable to MOD. MOD and other procedures in which adjunct is applied through a liquid may provide better coverage of the blank with adjunct than procedures in which the adjunct is supplied as a solid. An advantage may also be presented by methods such as dipping in that complex three dimensional shapes can be readily coated.

It is not critical that the adjunct be in contact with the blank during initial sintering, that is, sintering which does not result in an increase in density to full density.

Figure 8:
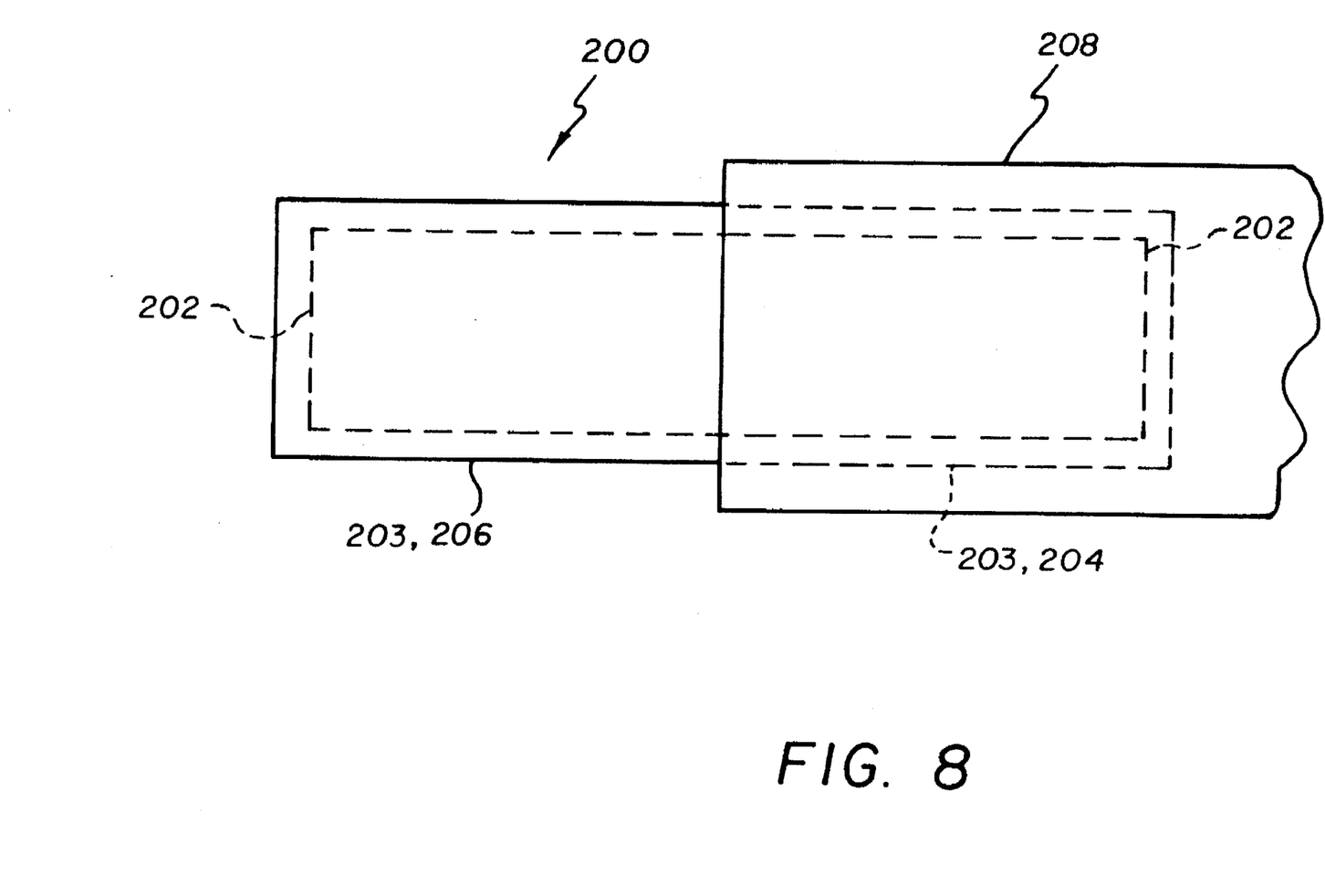
FIG. 8 shows the mechanical component joined with a portion of the machine.

The methods of the invention are applicable to the production of a variety of articles, particularly cutting tools and other abrasion and wear resistant machine parts, in that many mechanical components subject to friction have a longer service life if the working surface is a hard cast overlying a tough core. The terms "mechanical components subject to friction" and "mechanical components" are used herein to refer generically to tools and other machine parts that receive a frictional load and are thus subject to frictional abrasion and wear. Examples of tools include slitter knives, punches and dies; for cloth, cardboard, metal, polymeric materials and paper coated with abrasive material such as silver halides and the like. Referring now to FIG. 8, a mechanical component 200 of the invention has an interior or core 202 and an exterior 203, that is divided into an joinable portion 204 and a contact portion 206. The core 202 is continuous with and provides mechanical support for joinable and contact portions 204,206. The joinable portion 204 provides a means for gripping the mechanical component 200 or joining the mechanical component 200 to another portion of a machine (indicated in FIG. 8 by structure 208) and has the shape or conformation required for that function. In FIG. 8 the joinable portion is indicated by dashed lines. The contact portion 206 receives the frictional load and is subject to frictional abrasion and wear and has a shape or conformation appropriate to a particular use. For example, the shape of the contact portion of a perforator is determined largely by the shape of desired perforations.

The interior 202 of mechanical component 200 is a continuous mass of sintered particles, which are tetragonal structure zirconia alloy and have a uniform or substantially uniform composition. Because of this uniform or substantially uniform composition, the particles of core 202 are tetragonal or substantially tetragonal in structure where adjoining particles touch and are sintered together. This helps assure uniform toughness throughout core 202.

The monoclinic case provided by the method of the invention can be coextensive with the entire exterior 203 of mechanical component 200: both joinable and contact portions 204,206. Alternatively, the monoclinic case can be limited to part of exterior 203; for example, all or part of contact portion 206. Referring now to FIG. 8, in a particular embodiment of the invention, monoclinic case is coextensive with contact portion 206.

The monoclinic part of contact portion 206 is referred to herein as "premodified contact portion" or "premodified portion". The rest of the exterior, i.e., that part of exterior that does not contact the adjunct during the method of the invention, remains tetragonal. Core 202 remains tetragonal in all cases.

It is desirable that the premodified contact portion of mechanical component include the entire area of the working surface of the mechanical component; in other words, it is desirable that all parts of contact portion that would otherwise be subject to significant amounts of frictional abrasion and wear be monoclinic. The extent of premodified contact portion beyond those areas of contact portion subject to major amounts of friction is largely a matter of convenience.

If the premodified contact portion does not include the entire area of the working surface, then the working surface will include tetragonal structure areas that are subject to rapid frictional wear. Stress induced transformation to monoclinic form would occur in those areas during use; however, those areas would be abraded and would no longer exhibit their original conformation. This is highly undesirable. It is highly preferred that the premodified contact portion be at least coextensive with the working surface, since such a mechanical component has a working surface that is entirely monoclinic, has an appropriate conformation for a particular mechanical use, is unabraded prior to use, and is not subject to rapid abrasion.

FIG. 4 illustrates an specific example of a tool of the invention. A ceramic perforator 38 having cutting edge 40 mounted on mounting shank 42. Punch can be mounted by shank 42 on any typical punch assembly, such as a reciprocating punch or a rotary punch upon which can be mounted a plurality of punches 36. The monoclinic case of perforator 38, in a particular embodiment of the invention, is limited to part of contact portion: the working surface or cutting edge 40.

Typical hardnesses for cases of articles prepared by the methods of the invention are 15–16 GPa. This contrasts with hardnesses of 12–13 GPa typical of tetragonal zirconia. The configuration of articles prepared by the methods of the invention is limited by the requirements of cold compaction and sintering; for example, mold size and shape and sintering oven size and shape; but is not believed to be subject to other limitations. The methods and articles of the invention are not limited to discrete ceramic items, thus the terms blank and ceramic article and the like, used herein can also refer to portions of larger items.

The following Comparative Examples are presented for a further understanding of the invention:

COMPARATIVE EXAMPLE 1

Zirconia alloy having 3 mole percent $Y_2O_3$ was obtained as a prepared alloy powder from Z-TECH Corporation, Bow, N.H. The alloy powder had an agglomerate size range from 30 micrometers to 60 micrometers, an average agglomerate size of 50 micrometers, a grain size range from 0.1 micrometer to 0.6 micrometer, an average grain size of 0.3 micrometers, and a moisture content of 0.5 percent by volume. Polyvinyl alcohol in the amount of 4 percent by volume of the green part was added to the ceramic powder as a binder and mixed thoroughly by ball milling. The powder was compacted in the floating mold die press above described, at a compacting pressure of 15,000 psi (100 MPa) for 30 seconds and with a fill ratio of about 3.0, to compact the powder into a blank. The blank was placed on a tetragonal zirconia plate during sintering and was sintered by sequentially heating the green part from room temperature to 300° C. at a rate of 0.3° C./min., from 300° C. to 400° C. at a rate of 0.1° C./min., from 400° C. to 600° C. at a rate of 0.4° C./min., from 600° C. to 1500° C. at a rate of 1.5° C./min.; then maintaining the preform at 1500° C. for 120 minutes; and then sequentially cooling the part from 1500° C. to 800° C. at a rate of 2° C./minute, from 800° C. to room temperature at a rate of 1.6° C./minute. Dimensional shrinkage was uniform throughout the ceramic article to within 0.001 percent.

Figure 5:
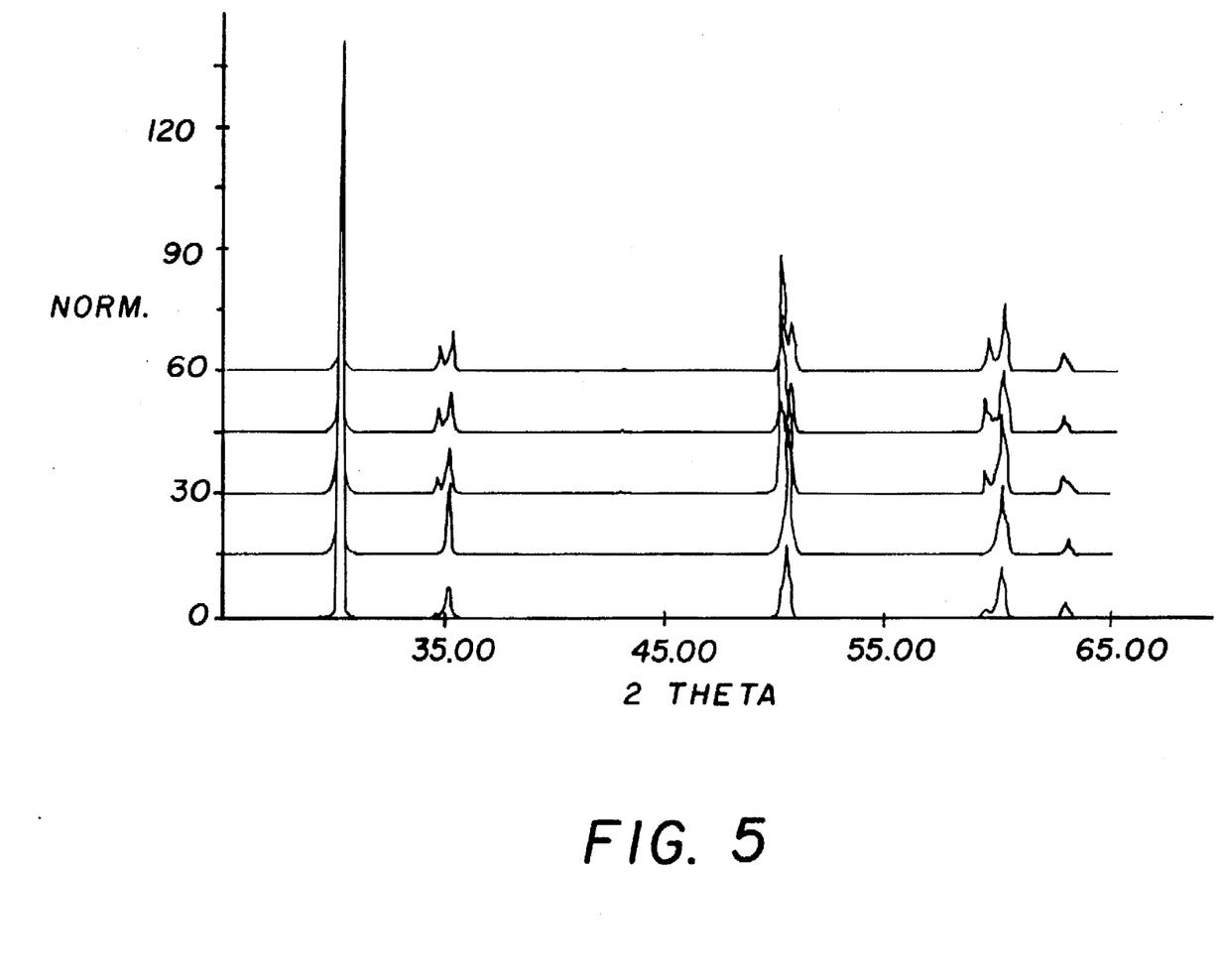
FIG. 5 is a typical X-ray diffraction plot, for both coupled and glancing angles, of the article of Comparative Example 1.

X-ray diffraction analysis was performed using an X-ray diffractometer manufactured by Phillips Corp. Coupled angle diffraction was used to detect the phases present at the core. Glancing angle diffraction was used to detect phases present at the cases. Tetragonal zirconia alloy was detected in both case and core. Results are presented in Table 1. A typical graph for both the coupled and the glancing angle X-ray diffraction patterns appears in FIG. 5.

Knoop indentation hardness was measured for indicated Comparative Examples and Examples as a function of load using a Tukon Microhardness Tester, Model #300 FM/DF. All measurements were made on flat and smooth (RMS less than 40 microns) surfaces. Nominal indentation load was 500 gf and an average was taken of at least ten indentation readings. Hardness values measured by Knoop indentation were in the range 12–13 GPa.

COMPARATIVE EXAMPLE 2

The procedures of Comparative Example 1 were followed with the exception that after sintering the article was coated by MOD precursor of MgO as follows. The precursor solution was prepared by mixing magnesium carbonate in toluene then adding the mixture to a 1:1 (volume/volume) mixture of 2-ethylhexanoic acid and toluene and filtering through 1 micron filter paper. The filtrate was concentrated in a rotary evaporator and spin coated on the blank at 5000 RPM for 60 seconds. The article was then sintered again using the same sintering procedure, following which X-ray diffraction analysis was performed as in Comparative Example 1. Results are presented in Table 1, which indicate that the case did not change phase.

COMPARATIVE EXAMPLE 3

The procedures of Comparative Example 1 were followed with the exception that the blank was sintered on an MgO plate. X-ray diffraction analysis results are presented in Table 1, which indicate a change in phase of the case. Hardness values measured by Knoop indentation were in the range 15–17 GPa.

COMPARATIVE EXAMPLE 4

The procedures of Comparative Example 1 were followed with the exception that the blank was sintered on an $Al_2O_3$ plate on which was sprinkled very fine (0.3 micrometer) MgO powder. X-ray diffraction analysis results, which indicate a change in phase of the case, are presented in Table 1.

COMPARATIVE EXAMPLE 5

The procedures of Comparative Example 2 were followed with the exception that the blank was coated with MOD precursor of MgO prior to sintering and the article was not sintered a second time. X-ray diffraction analysis results, which indicate a change in phase of the case, are presented in Table 1.

The following Example is presented for a further understanding of the invention:

EXAMPLE 1

Figure 6:
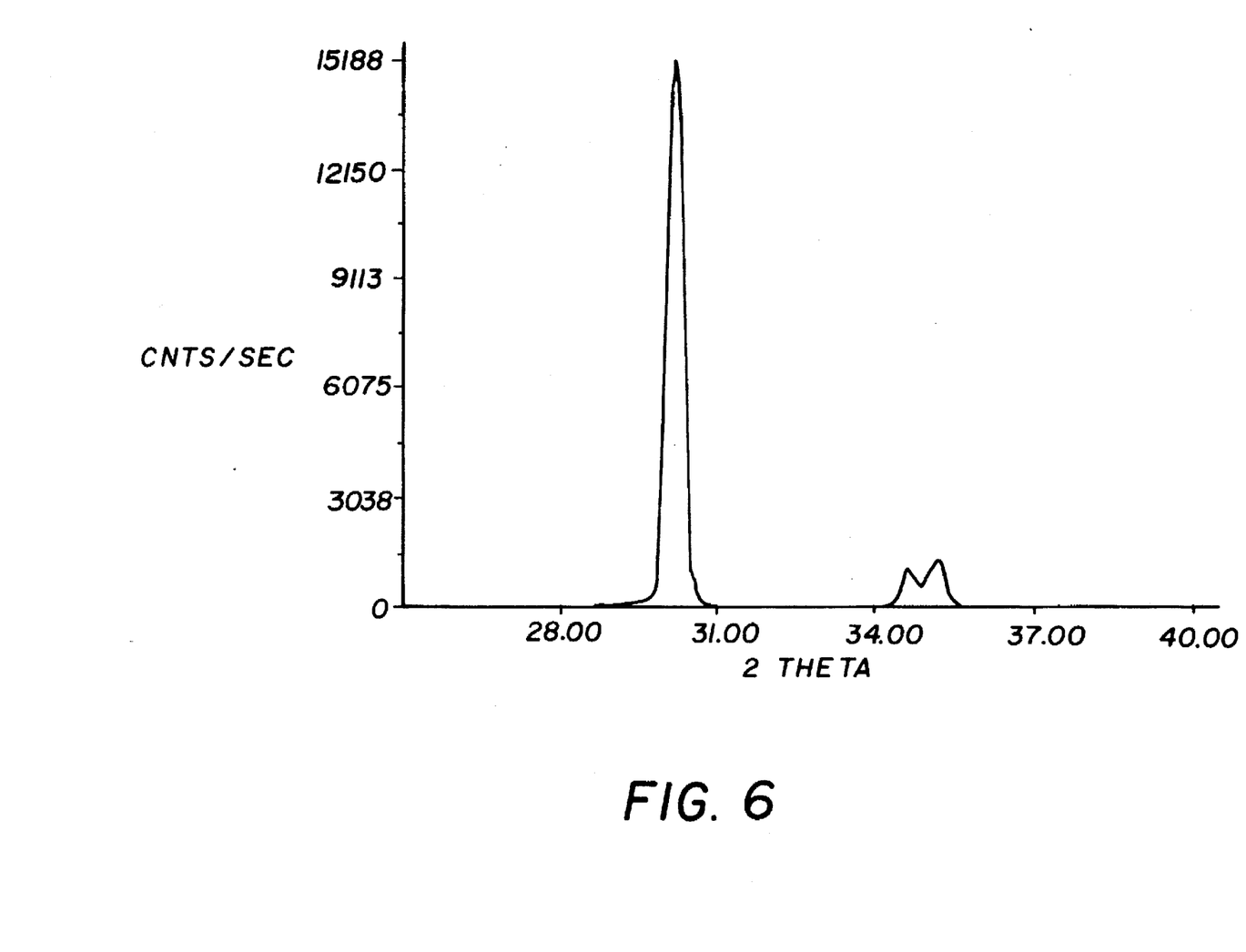
FIG. 6 is a coupled angle X-ray diffraction plot of the article of the Example.
Figure 7:
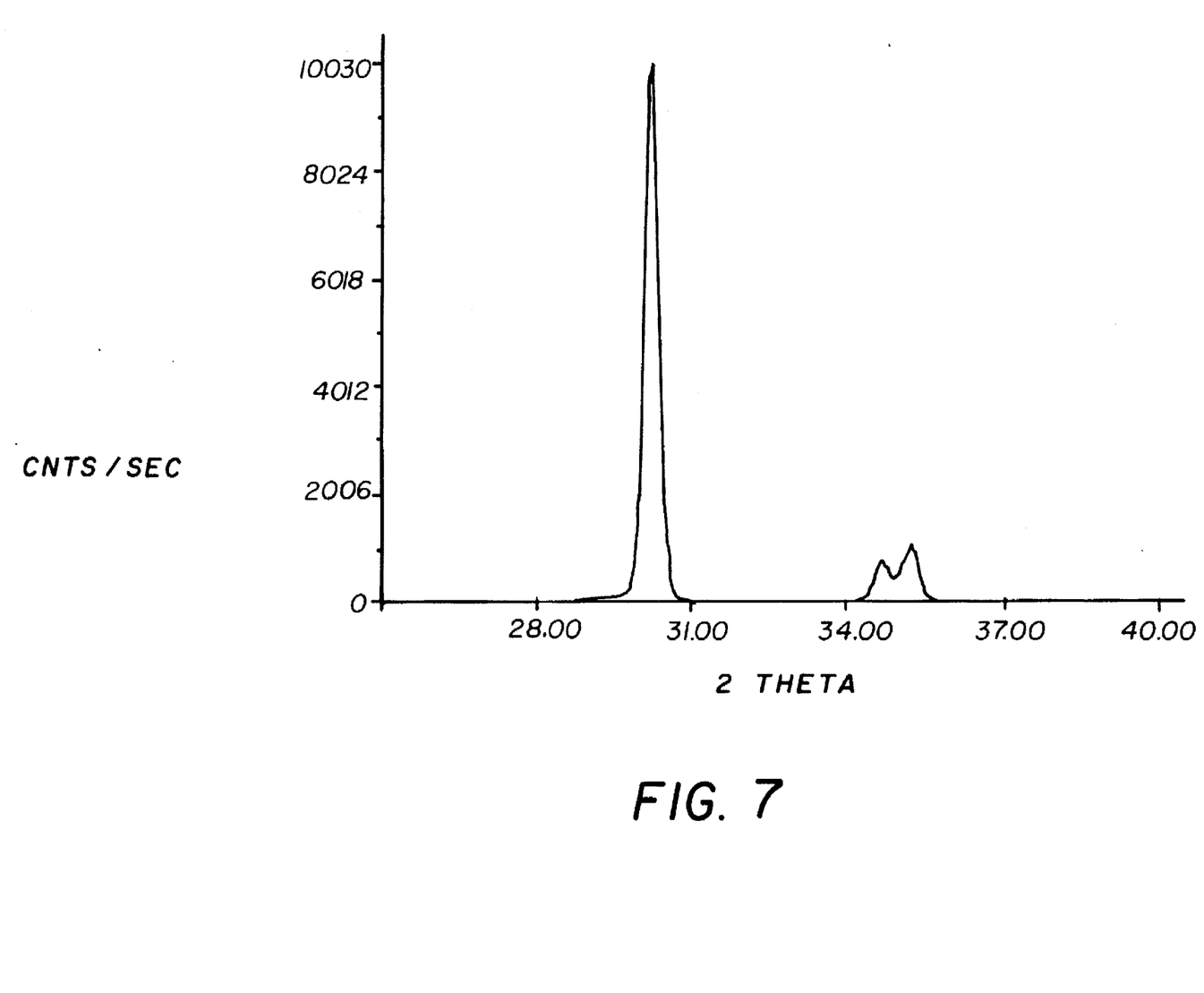
FIG. 7 is a series of glancing angle X-ray diffraction plots of the article of the Example.

The procedures of Comparative Example 1 were followed with the exception that the blank was sintered for 2 hours at 1500 degrees C. with one side of the blank packed in very fine (approximately 0.3 micrometer) pure zirconia powder. Coupled angle X-ray diffraction indicated that the core was tetragonal phase. (FIG. 5, discussed above in relation to Comparative Example 1 is a typical graph for tetragonal phase zirconia alloy.) Glancing angle X-ray diffraction demonstrated a monoclinic phase case on the surface in contact with the zirconia powder, but tetragonal phase on the other surfaces. A graph of a tetragonal phase surface is shown in FIG. 6. A graph of a series of glancing angle X-ray diffraction plots of the monoclinic phase case, at several glancing angles, all indicating monoclinic phase, are shown in FIG. 7. Surface hardness of the monoclinic surfaces was 15 to 16 GPa.

TABLE 1

COMPARATIVE EXAMPLES
X-RAY DIFFRACTION SCANS FROM 2 THETA = 20–40 DEGREES,
Cu K ALPHA

| | | Peaks observed at 2 theta degrees: | | | | | |
|---|---|---|---|---|---|---|---|
| # | Scanning Angle | 28.2 M(−111) | 30.3–5 T(111) | 31.5 M(111) | 34.7 T(002) C(200) | 35.2–3 T(200) | Comments |
| 1 | glancing | absent | very strong | absent | strong | strong absent | |
| Interpretation: tetragonal phase | | | | | | | |
| 1 | coupled | absent | very strong | absent | strong | strong absent | |
| 2 | glancing | weak | very strong | weak | strong | strong absent | |
| Interpretation: | tetragonal phase predominant monoclinic phase at minor level (1–10%) | | | | | | |
| 3 | glancing | absent | very strong | absent | weak | weak strong | |
| Interpretation: | cubic phase predominant tetragonal phase at minor level (1–10%) | | | | | | |
| 3 | coupled | absent | very strong | absent | strong | strong absent | |
| Interpretation: tetragonal phase | | | | | | | |
| 4 | glancing | absent | very strong | absent | weak | weak strong | |
| Interpretation: | cubic phase predominant tetragonal phase at minor level (1–10%) | | | | | | |
| 5 | glancing | weak | very strong | weak | absent | absent strong | |
| Interpretation: | cubic phase predominant monoclinic phase at minor level (1–10%) | | | | | | |

While specific embodiments of the invention have been shown and described herein for purposes of illustration, the protection afforded by any patent which may issue upon this application is not strictly limited to a disclosed embodiment; but rather extends to all modifications and arrangements which fall fairly within the scope of the claims which are appended hereto.

What is claimed is:

1. A sintered mechanical component for use as part of a machine, said mechanical component comprising an joinable portion, a core, and a premodified portion, said joinable portion being joinable to said machine, said core being interior to and continuous with said joinable portion, said core being interior to and continuous with said premodified portion, said core consisting essentially of sintered first particles having a substantially tetragonal crystalline structure and a substantially uniform elemental composition including Zr, O, and at least one element selected from the group consisting of Mg, Ca, Y, Sc and rare earth elements, said premodified portion consisting essentially of sintered second particles having a substantially monoclinic crystalline structure and a substantially uniform elemental composition including Zr and O, said substantially monoclinic crystalline structure being a thermodynamic equilibrium structure.

2. The mechanical component of claim 1 wherein said core is a continuous mass of sintered particles, each said particle having a composition that is at least substantially uniform.

3. The mechanical component of claim 1 wherein said core is continuous and provides mechanical support for said joinable portion and said premodified portion.

4. The mechanical component of claim 1 wherein said contact portion is substantially unabraded.

5. The mechanical component of claim 1 wherein said premodified contact portion receives an abrasive frictional load during said use.

6. A mechanical component for use with a machine, said mechanical component comprising a core and an exterior, said core consisting essentially of a mass of sintered particles having a substantially tetragonal crystalline structure and an elemental composition including Zr, O, and at least one element selected from the group consisting of Mg, Ca, Y, Sc and rare earth elements, said exterior having a joinable portion and a contact portion, said joinable portion being joinable to said machine, said contact portion including a working surface, said working surface being at least substantially unabraded, said working surface consisting essentially of a mass of sintered particles having a substantially monoclinic crystalline structure and an elemental composition including Zr and O, said substantially monoclinic crystalline structure being a thermodynamic equilibrium structure.

7. The mechanical component of claim 6 wherein said mechanical component is produced by a method comprising compacting a particulate alloy of a primary oxide and a secondary oxide to form a blank, said primary oxide being zirconium oxide, said secondary oxide being selected from the group consisting of MgO, CaO, $Y_2O_3$, $Sc_2O_3$, rare earth oxides and combinations thereof, and sintering said blank in contact with substantially pure zirconium oxide.

8. The mechanical component of claim 6 wherein said core is interior to and continuous with said joinable portion and said core is interior to and continuous with said contact portion.

9. The mechanical component of claim 6 wherein said contact portion consists essentially of a mass of sintered particles having a substantially monoclinic crystalline structure and an elemental composition including Zr and O.

10. The mechanical component of claim 6 wherein said exterior consists essentially of a mass of sintered particles having a substantially monoclinic crystalline structure and an elemental composition including Zr and O.

* * * * *